US012333637B1

(12) United States Patent
Degtiarev et al.

(10) Patent No.: US 12,333,637 B1
(45) Date of Patent: *Jun. 17, 2025

(54) AI-DRIVEN FOREGROUND STYLIZATION USING DIFFUSION AND OBJECT DETECTION

(71) Applicant: Glam Labs, Inc., San Francisco, CA (US)

(72) Inventors: Roman Degtiarev, Tbilisi (GE); Tikhon Vorobev, Saint Petersburg (RU)

(73) Assignee: Glam Labs, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/038,477

(22) Filed: Jan. 27, 2025

Related U.S. Application Data

(63) Continuation-in-part of application No. 18/748,397, filed on Jun. 20, 2024, now Pat. No. 12,211,180.

(51) Int. Cl.
*G06T 11/60* (2006.01)
*G06T 5/50* (2006.01)
*G06T 5/60* (2024.01)
*G06T 5/70* (2024.01)

(52) U.S. Cl.
CPC ............. *G06T 11/60* (2013.01); *G06T 5/50* (2013.01); *G06T 5/60* (2024.01); *G06T 5/70* (2024.01); *G06T 2207/20081* (2013.01); *G06T 2207/20084* (2013.01); *G06T 2207/30196* (2013.01)

(58) Field of Classification Search
None
See application file for complete search history.

(56) References Cited

U.S. PATENT DOCUMENTS

2024/0264718 A1* 8/2024 Benedetto ............. G06N 3/047

* cited by examiner

*Primary Examiner* — Yanna Wu
(74) *Attorney, Agent, or Firm* — Georgiy L. Khayet

(57) ABSTRACT

Systems and methods for Artificial Intelligence-driven foreground stylization using diffusion and object detection are provided. An example method includes receiving an image, receiving a text including an instruction for transforming the object, extracting, from the image, a foreground image corresponding to an object, determining a mask corresponding to the object, encoding the foreground image into an image latent, encoding the text into a text embedding, generating a first noise for the image latent, combining the first noise and the image latent to obtain a noisy image latent, providing the noisy image latent and the text embedding to a first neural network to generate a second noise, removing the second noise from the noisy image latent to obtain a denoised image latent, decoding, using a second neural network, the denoised image latent into an output image, and generating a result image based on the mask, the output image, and the image.

16 Claims, 8 Drawing Sheets

AI-DRIVEN FOREGROUND STYLIZATION USING DIFFUSION AND OBJECT DETECTION

CROSS-REFERENCE TO RELATED APPLICATIONS

This application is a Continuation-in-Part of and claims the priority benefit of U.S. patent application Ser. No. 18/748,397, entitled "AI-DRIVEN PHOTO STYLIZATION WITH TEXT DESCRIPTION TUNING" and filed on Jun. 20, 2024. The subject matter of the aforementioned application is incorporated herein by reference in its entirety for all purposes.

TECHNICAL FIELD

This disclosure generally relates to image processing. More particularly, this disclosure relates to systems and methods for Artificial Intelligence (AI)-driven foreground stylization using diffusion and object detection.

BACKGROUND

AI-based image generation and transformation is used in many applications, such as video chats, social networks, online media, and others. One of the main problems encountered during image transformations is the inability to process the foreground of an image independently from its background. In many cases, both foreground and background are subjected to the same transformation process, which can result in a loss of contextual integrity or misrepresentation of the intended focus of the image. Specifically, when stylizing an image, applying the same visual effect to both the object (foreground) and the environment (background) may lead to visual clutter or distraction from the main object. This constraint hinders the usability of conventional image processing techniques in scenarios where the processing should focus on the primary object of the image, such as stylizing individuals depicted in the image or emphasizing products in online advertisements.

Conventional image processing methods often struggle with accurately distinguishing between the foreground and background, leading to either partial transformations or undesired artifacts. Additionally, conventional image processing methods lack the ability to selectively modify the foreground without also modifying the background, thereby limiting their creative control and effectiveness.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to an example embodiment of the present disclosure, a method for AI-driven foreground stylization using diffusion and object detection is provided. The method may include receiving an image including an object. The method may then proceed with receiving a text that includes at least one instruction for transforming the object. The method may proceed with extracting, from the image, a foreground image corresponding to the object. The method may further include determining, based on the image, a mask corresponding to the object. The method may proceed with encoding the foreground image into an image latent and encoding the text into a text embedding. The method may further include randomly generating a first noise for the image latent and combining the first noise and the image latent to obtain a noisy image latent. The method may proceed with providing the noisy image latent and the text embedding to a first neural network to generate a second noise and removing the second noise from the noisy image latent to obtain a denoised image latent. The method may further include decoding, using a second neural network, the denoised image latent into an output image and generating a result image based on the mask, the output image, and the image.

According to another embodiment, a system for AI-driven foreground stylization using diffusion and object detection is provided. The system may include at least one processor and a memory storing processor-executable instructions, where the processor can be configured to implement the operations of the above-mentioned method for AI-driven foreground stylization using diffusion and object detection.

According to yet another aspect of the disclosure, there is provided a non-transitory computer-readable storage medium, which stores processor-readable instructions. When the computer-readable instructions are executed by a computing device, they cause the computing device to implement the above-mentioned method for AI-driven foreground stylization using diffusion and object detection.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to." The terms "can" and "may" shall mean "possibly be, but not limited to be."

This disclosure describes methods and systems for AI-driven foreground stylization using diffusion and object detection. An example method of the present disclosure provides stylizing of only the main object in an image while preserving the original background. The method may include determining a main object in an image, cutting out the main object as a foreground image from the image using a foreground mask. Specifically, the foreground mask of the main object may be found using a segmentation model. Then, the smallest bounding box that covers the foreground mask may be selected. The foreground image may be cut out from this box and stylized by applying masked diffusion with a control net to the foreground image. The method may further include performing soft insertion of the processed foreground image to the image using the foreground mask. Specifically, the resulting stylized foreground image may be inserted back into the original image by soft blending of the stylized foreground image and the original image using the foreground mask.

Unlike existing solutions, embodiments of the present disclosure employ diffusion-based models and object detection models to precisely identify and isolate the foreground from the background. This enables targeted stylization of the foreground while preserving the original appearance of the background, resulting in visually coherent and contextually meaningful transformations.

Figure 1:
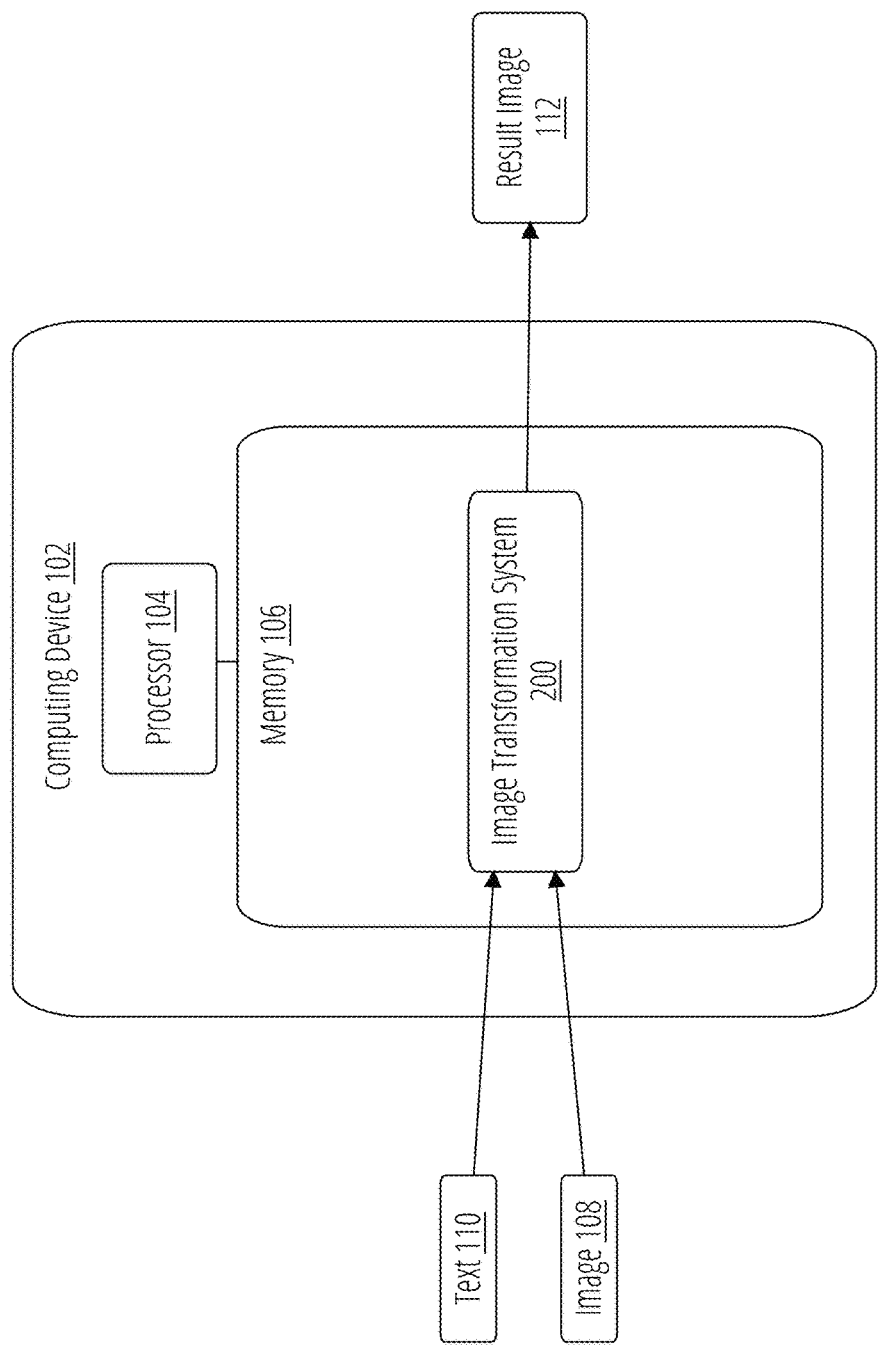
FIG. 1 shows an example environment, in which system and methods for AI-driven foreground stylization using diffusion and object detection can be implemented, according to an example embodiment.

Referring now to the drawings, FIG. 1 shows an example environment 100, in which system and methods for AI-driven foreground stylization using diffusion and object detection can be implemented. Environment 100 may include a computing device 102 that may include a processor 104 and a memory 106. Memory 106 may store, as processor-executable instructions, an image transformation system 200.

Computing device 102 may include, but is not limited to, a laptop computer or desktop computer including a graphic processing unit. In some embodiments, computing device 102 can be a part of cloud-based computing resource(s) shared by multiple users. The cloud-based computing resource(s) can include hardware and software available at a remote location and accessible over a data network. The cloud-based computing resource(s) can be dynamically re-allocated based on demand. The cloud-based computing resource(s) may include one or more server farms/clusters including a collection of computer servers that can be co-located with network switches and/or routers.

Image transformation system 200 may receive an image 108 and a text 110. The text 110 may include a prompt on how to stylize the image 108. Image transformation system 200 can generate a result image 112 based on the image 108 and the text 110. In various embodiments, the prompts in text 110 may include, for example, "generate image in anime style," "change the hair color of a person," "do not modify the background," and so forth. Image 108 and text 110 can be provided by a user of computing device 102 via a user interface. Details of image transformation system 200 are described with reference to FIG. 2.

Figure 2:
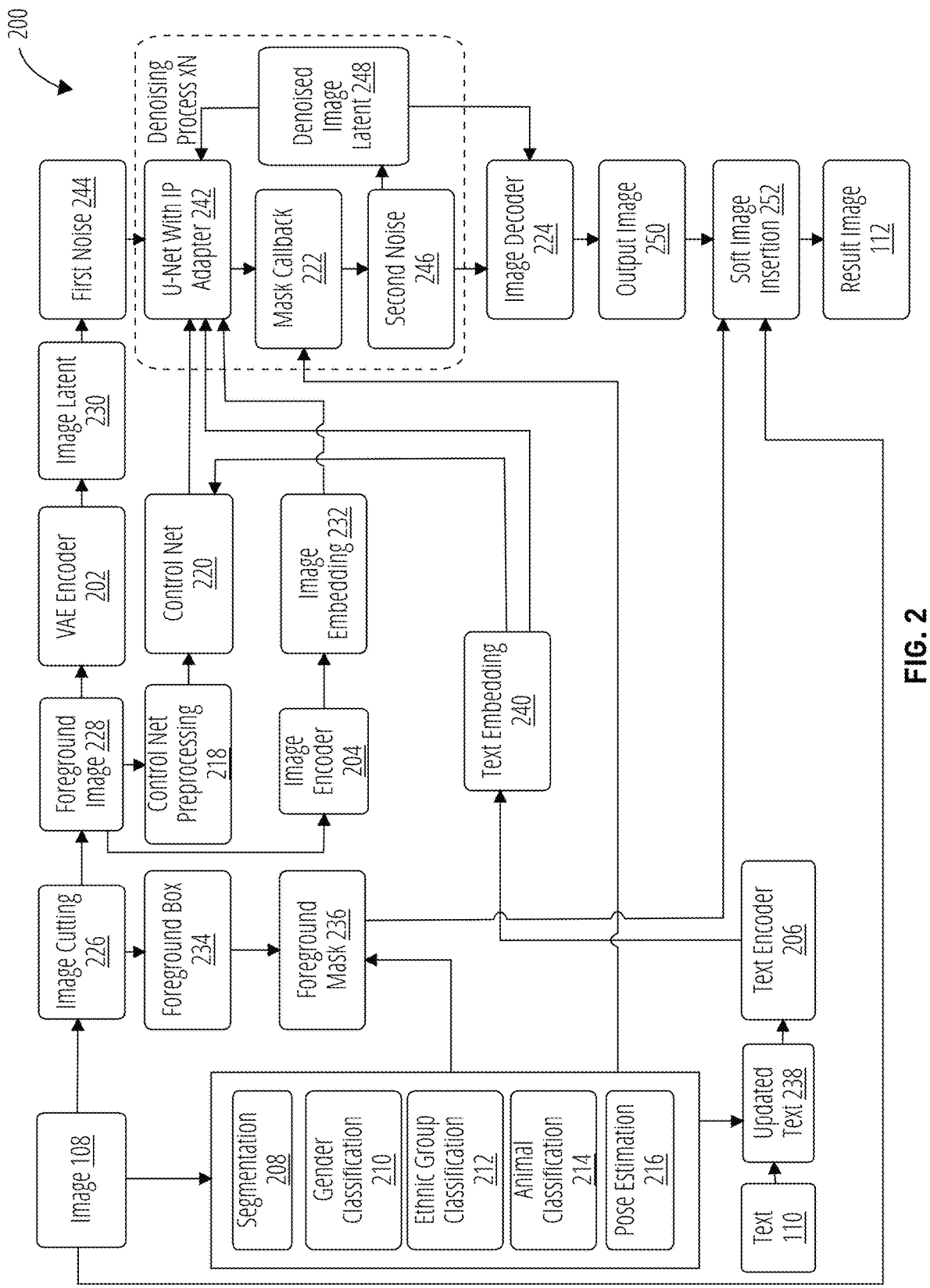
FIG. 2 is a block diagram showing modules of an image transformation system, according to an example embodiment.

FIG. 2 is a block diagram showing modules of an image transformation system 200, according to some example embodiments. The image transformation system 200 may include a Variational Autoencoder (VAE) encoder 202, an image encoder 204, a text encoder 206, a segmentation 208, a gender classification 210, an ethnic group classification 212, an animal classification 214, a pose estimation 216, a control net preprocessing 218, a control net 220, a U-Net with Input Processing (IP) Adapter 242, a mask callback 222, and an image decoder 224. In other example embodiments, the image transformation system 200 may include fewer or more modules than shown in FIG. 2.

The image 108 may be provided to image cutting 226 for cutting a foreground from the image 108 to obtain a foreground image 228. In an example embodiment, the foreground image 228 is an image of a main object depicted in the image 108. The main object may include, for example, a person, an animal, a group of people and/or animals, a cartoon character, a game character, and so forth.

The foreground image 228 may be provided to the VAE encoder 202. VAE encoder 202 may include a generative model that encodes input data into a probabilistic latent space and decodes it back to generate data, thereby enabling smooth data representation and generation. VAE encoder 202 may receive the foreground image 228 in one of computer readable formats and encode the foreground image 228 into image latent 230 (also referred to as a latent vector). Image latent 230 may refer to a numerical representation of foreground image 228 in a vector space associated with a diffusion model.

Image encoder 204 may receive the foreground image 228 in one of computer readable formats and encode the foreground image 228 into an image embedding 232. The image embedding 232 may refer to a compressed, continuous, and typically lower-dimensional representation of foreground image 228 in a latent space. In some embodiments, image encoder 204 can be a convolutional neural network (CNN), for example, Contrastive Language-Image Pretraining (CLIP), or other type of network designed to extract meaningful features from images.

The image cutting 226 may be used to cut out, from the image 108, a portion corresponding to a bounding box. The bounding box may include a rectangular region defined by its coordinates and used to encapsulate and localize an object of interest within an image. As a result, a foreground box 234 may be provided by the image cutting 226. The smallest bounding box that contains the entire main object can be selected as foreground box 234. The foreground box 234 is then used to obtain a foreground mask 236.

Segmentation 208 may analyze image 108 to determine portions of image 108. The portions can be provided to mask callback 222 to generate masks for the portions. The masks may include a mask for the body of a person in image 108, a mask for a face region in image 108, a mask for hair region of the person in image 108, and so forth. One or more portions determined by the segmentation 208 along with the foreground box 234 may be used to obtain the foreground mask 236. Specifically, the foreground mask 236 may be a mask of the main object present in the image 108.

Gender classification 210 may analyze image 108 to determine a gender of a person present in image 108. Ethnic group classification 212 may analyze image 108 to determine an ethnic group of the person. Pose estimation 216 (such as DensePose model for dense human pose estimation) may predict a pose of the person in image 108, for example, whether the person is facing away or facing the camera. Image transformation system 200 may further include one or more models for detecting further features of the person present in image 108, such an age, a hairstyle, and so forth. Animal classification 214 may analyze image 108 to determine a type and/or a breed of an animal present in image 108. In various embodiments, segmentation 208, gender classification 210, ethnic group classification 212, animal classification 214, and pose estimation 216 can be implemented as pretrained neural networks.

The features determined by gender classification 210, ethnic group classification 212, animal classification 214, and pose estimation 216 can be added to text 110 to form an updated text 238. The example features added to the text 110 may include "an African young woman facing the camera," "a Caucasian man facing away from the camera," "a girl raising her right hand," and so forth. For example, if original text 110 includes "woman portrayed in an anime style" and ethnic group classification 212 determines that image 108 includes an African woman, then the text 110 can be modified to "an African woman in anime style." Updated text 238 can be provided to text encoder 206.

Text encoder 206 may transform the updated text 238 to a text embedding 240. The text embedding 240 may refer to a numerical representation of a text in a latent space. The latent space of text embedding 240 aligns with the latent space of image embedding 232 generated by the image encoder 204. The text encoder 206 can be CLIP, or other networks designed to transform the text into text embeddings.

Control net preprocessing 218 may analyze foreground image 228 to determine an additional input for the control net 220. The additional input may include sketches, outlines, edge maps, key points, and other features in the foreground image 228. The control net 220 may include a neural network that controls diffusion models by adding extra conditions. Control net 220 can generate, based on text embedding 240 and the additional input, a control vector in an internal format readable by U-net with IP adapter 242. In an example embodiment, a human pose, a normal map (for example, tangent-space normal map and object-space normal map), an edges map may be used as spatial control in the control net 220.

Image transformation system 200 can generate a first noise 244 of the same size as the image latent 230. This first noise 244 typically consists of randomly generated Gaussian noise for a specific portion of image latent 230 that corresponds to a section of foreground image 228. The first noise 244 can be injected into the image latent 230 to obtain noisy image latent. The noisy image latent is processed by U-net with IP adapter 242.

U-net with IP adapter 242 may include a U-net and an IP Adapter. U-Net is a convolutional neural network developed for image segmentation. U-Net may include cross-attention layers to integrate the text embedding 240, the image embedding 232, and a control vector generated by control net 220. U-Net is trained to predict second noise 246. This second noise 246 represents the difference between the noisy image latent and the denoised approximation that aligns with the true data distribution of image latents. This true data distribution approximates the probability distribution of clean image latents derived from a set of sample images.

The IP Adapter is an image prompt adapter configured to integrate seamlessly with diffusion models, enabling image prompting without requiring any modifications to the underlying model. IP Adapter can be an additional module or component that modifies how the input data is processed before being fed to the U-Net. Combining the U-Net with the IP Adapter allows incorporating additional inputs and control mechanisms to enhance the image processing capabilities of the U-Net. The IP Adapter can process the image embedding 232 to extract useful information or modify the image embedding 232 to ensure that the U-Net generates correct output.

Mask callback 222 can generate a mask determining how different parts of foreground image 228 are processed. Specifically, mask callback 222 creates a mask that defines to what extent to process and change different parts of foreground image 228 (for example, faces, facial features, other elements of foreground, and so forth). Accordingly in some embodiments, image transformation system 200 can generate different first noise 244 (and correspondently, second noise 246) for various portions of foreground image 228, allowing specific regions to be modified differently. This targeted approach ensures that some areas of foreground image 228 are altered less or more than others, enabling the application of different styles to specific sections based, for example, on the prompts provided in text 110. The first noise 244 can be injected only into the part of image latent 230 that corresponds to a region of foreground image 228 defined by the mask.

The image transformation system 200 may utilize second noise 246 to obtain a denoised image latent 248 by applying a linear transformation to the noisy image latent. The denoised image latent 248 can then be processed by U-net with IP adapter 242 to update second noise 246, which in turn can be used to update the denoised image latent 248. This iterative process of predicting second noise 246 and updating denoised image latent 248 can be repeated several times (e.g., five or xN times) until the denoised image latent 248 converges to an image latent belonging to the true data distribution of embedding corresponding to images. Thus, the iterative process progressively aligns the denoised image latent 248 with the desired data distribution and achieve high-quality stylization.

After the iterative denoising steps, the denoised image latent 248 is provided to image decoder 224. The image decoder 224, which may include a VAE decoder, processes the refined denoised image latent 248 to reconstruct an output image 250 that aligns with the stylistic instructions while preserving the key features of the original image.

The image 108, the foreground mask 236, and the output image 250 may be provided to soft image insertion 252. The soft image insertion 252 may blend the output image 250 and the image 108 using the foreground mask 236 to provide a result image 112. Accordingly, the result image 112 has the same background as the background in the image 108, but has a modified foreground that includes the output image 250.

Figure 3:
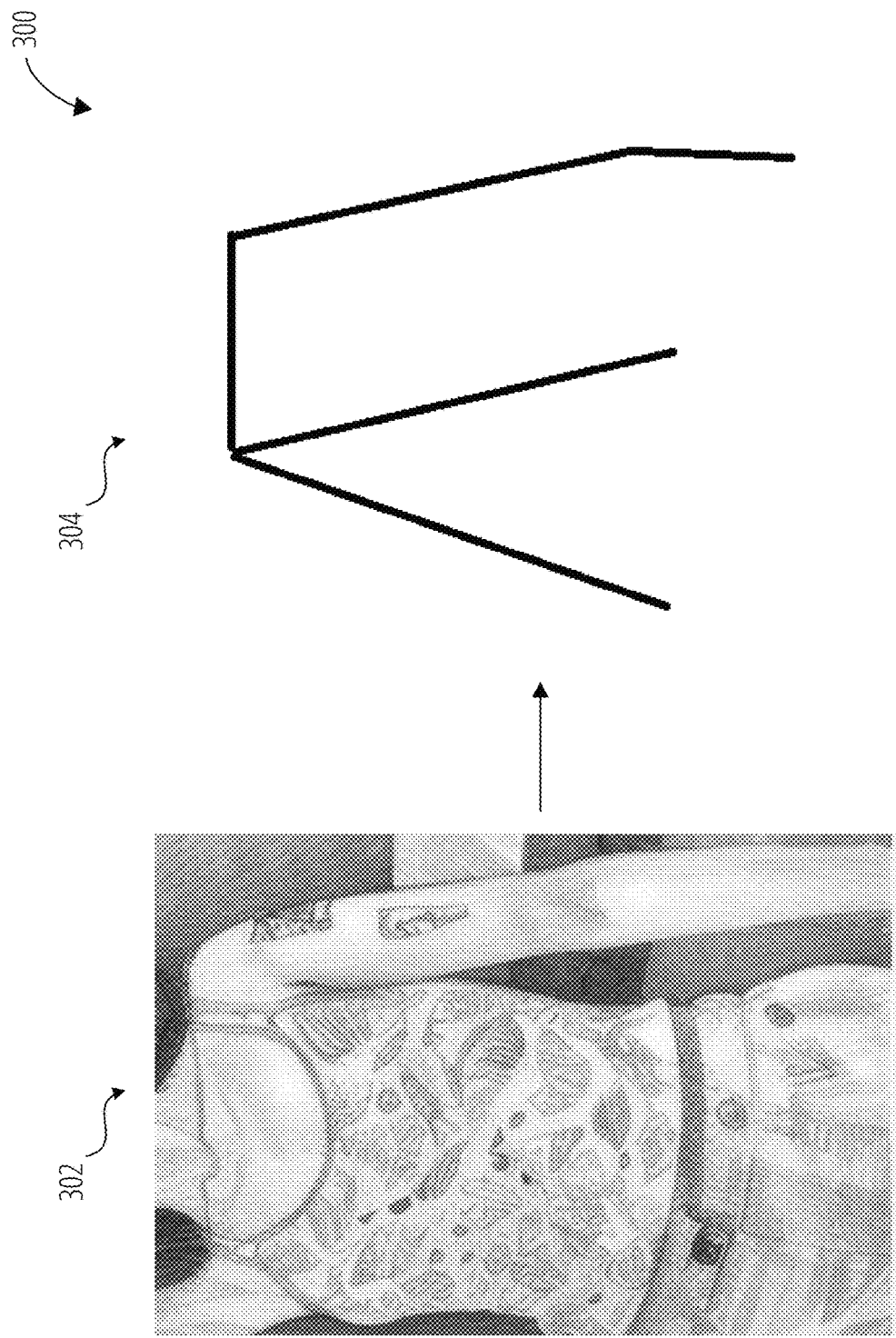
FIG. 3 is a schematic showing an example image and a corresponding skeleton, according to an example embodiment.

FIG. 3 is a schematic 300 showing an example image 302 and corresponding skeleton 304. Pose estimation 216 (shown in FIG. 2) may include a neural network that generates skeleton 304 from the image 302. Points in skeleton 304 can be assigned colors indicating a coordinate of the points from the point of view of the camera. In some embodiments, the skeleton 304 can be generated by a DensePose.

Pose estimation 216 may include a model that determines the pose of the person in image 302. For example, if the coordinate of the left shoulder is less than the coordinate of the right shoulder, then the person is facing forward. If the shoulders are not visible, the model may analyze the hips. If the coordinate of the left hip is smaller than the right hip, then the person is facing forward. On the contrary, if the coordinate of the right shoulder (or hip) is smaller than the left one, then the person is facing backwards.

In example of FIG. 3, the left shoulder is less than the coordinate of the right shoulder. It means that the person is facing forward. Accordingly, if original text 110 (shown in FIG. 2) includes "woman in anime style," then the text 110 can be modified to "woman in anime style in front."

Figure 4:
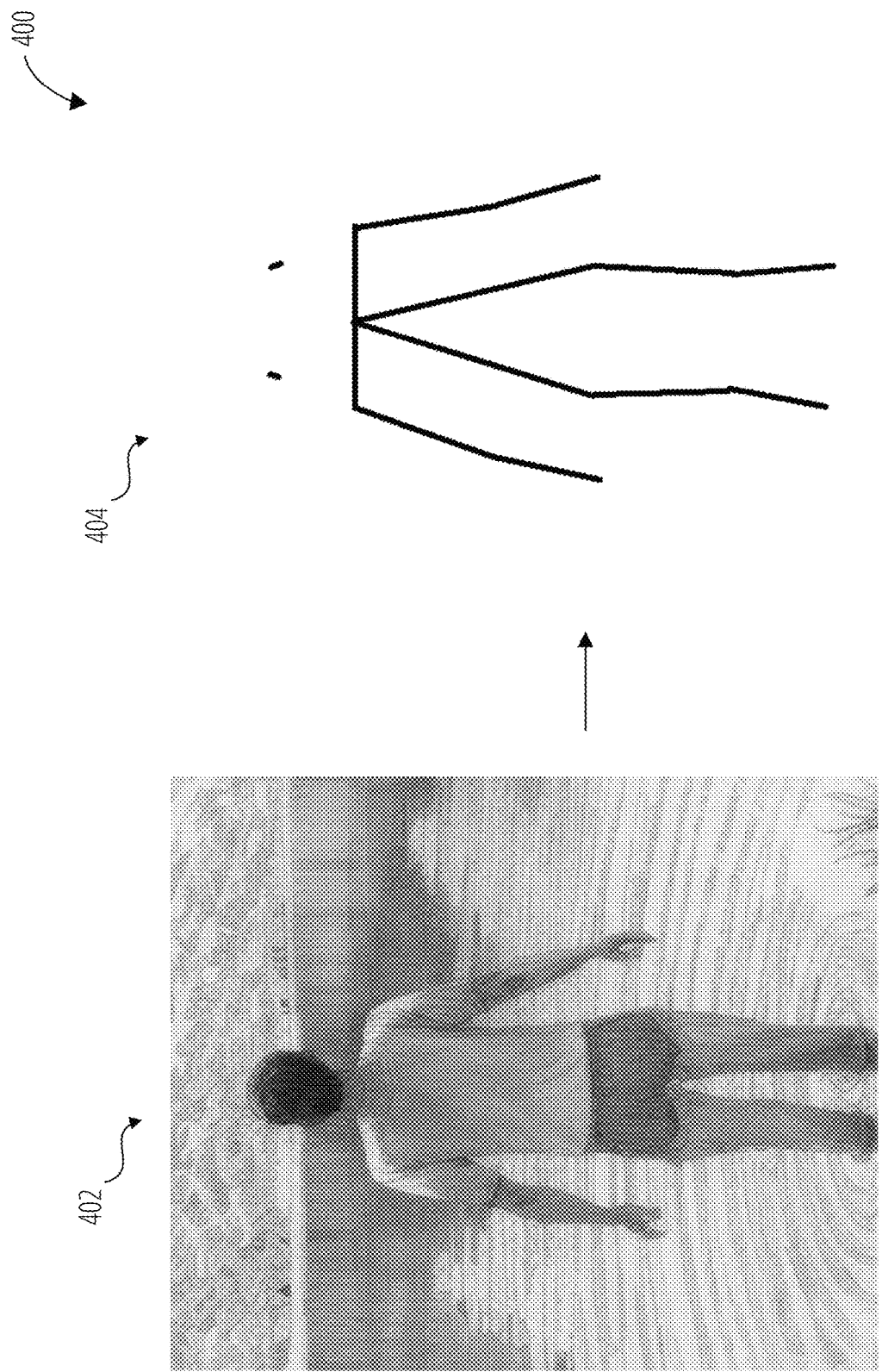
FIG. 4 is a schematic showing an example image and a corresponding skeleton, according to an example embodiment.

FIG. 4 is a schematic 400 showing an example image 402 and corresponding skeleton 404. In image 402, a person is shown in full length. In corresponding skeleton 404, the left shoulder and the right shoulder have the same coordinate from the point of view of the camera. However, the coordinate of the right hip is smaller than the coordinate of the left hip. It means that the person is facing backwards. Accordingly, if original text 110 includes "a man in anime style," then the text 110 can be modified to "body of man in anime style from behind."

Figure 5:
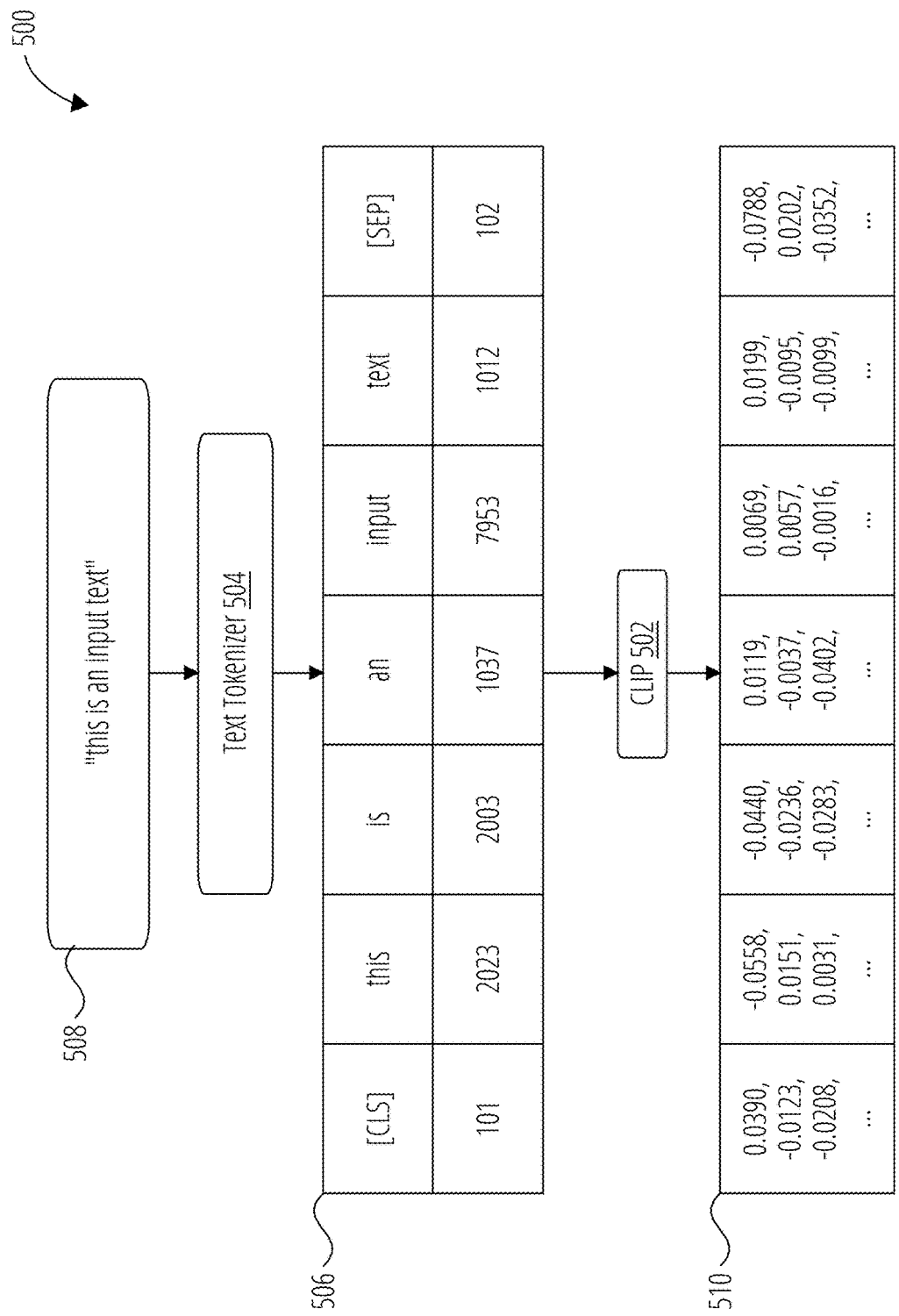
FIG. 5 is a block diagram showing details of a text encoder, according to an example embodiment.

FIG. 5 is a block diagram 500 showing details of converting text into text embedding (shown in FIG. 2), according to an example embodiment. In the example of FIG. 2, CLIP 502 used as text encoder 206 shown in FIG. 2.

Text tokenizer 504 may generate text tokens 506 from raw text 508, for example, text 110. Then, text tokens 506 can be provided to CLIP 502 to generate text embeddings 510.

Figure 6:
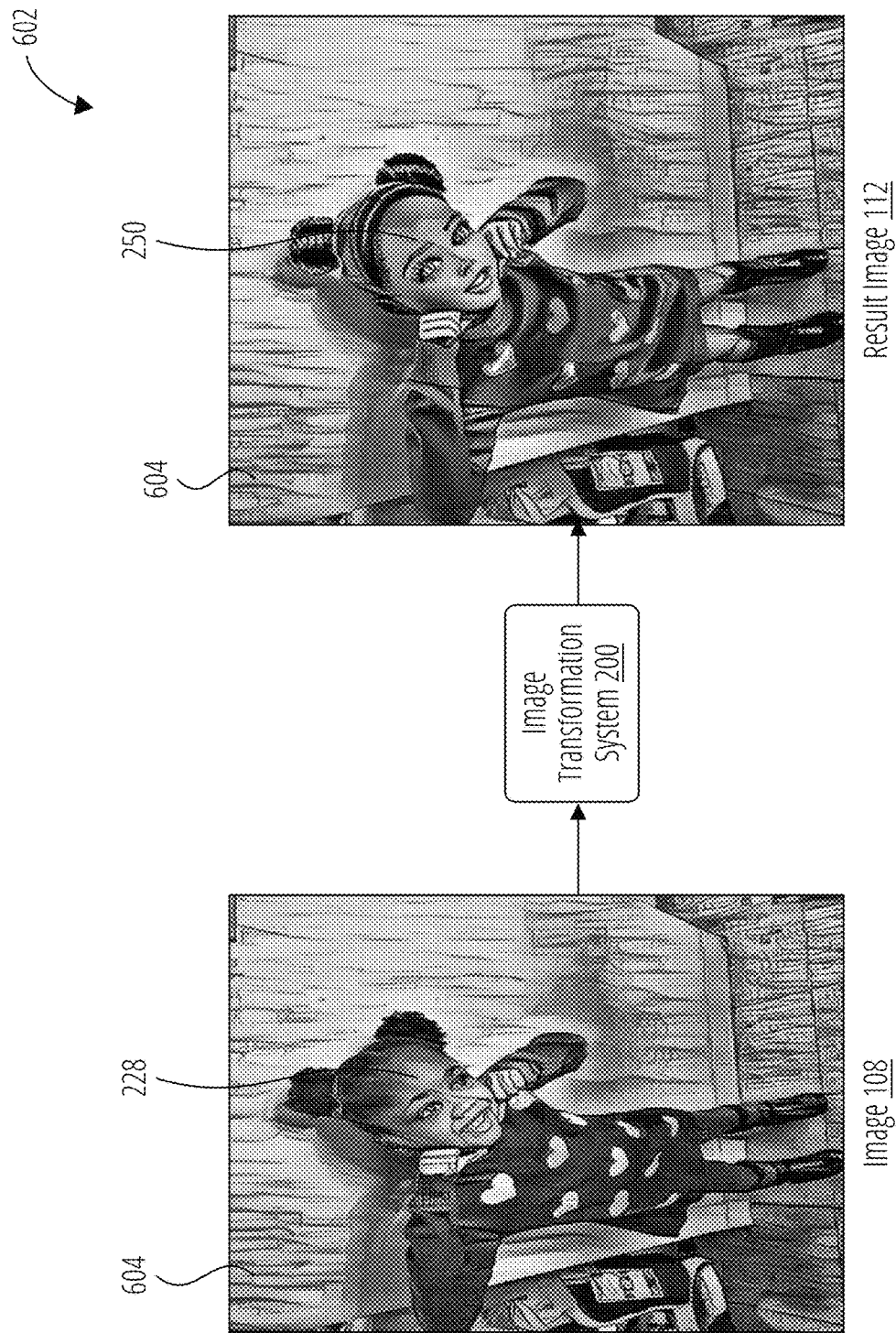
FIG. 6 is a schematic showing processing of an image by an image transformation system, according to an example embodiment.

FIG. 6 is a schematic 602 showing processing of an image by an image transformation system 200, according to an example embodiment. An image 108 may be provided to the image transformation system 200. The image transformation system 200 may cut the image 108 into a background image 604 and a foreground image 228. In an example embodiment, the foreground image 228 may include an image of a person depicted in the image 108. The image transformation system 200 may process the foreground image 228 by transforming the foreground image 228 into an output image 250. The processing may include, for example, transforming the image of the person into an image in an anime style. Upon generating the output image 250, the image transformation system 200 may combine the background image 604 and the output image 250 to produce a result image 112.

Figure 7:
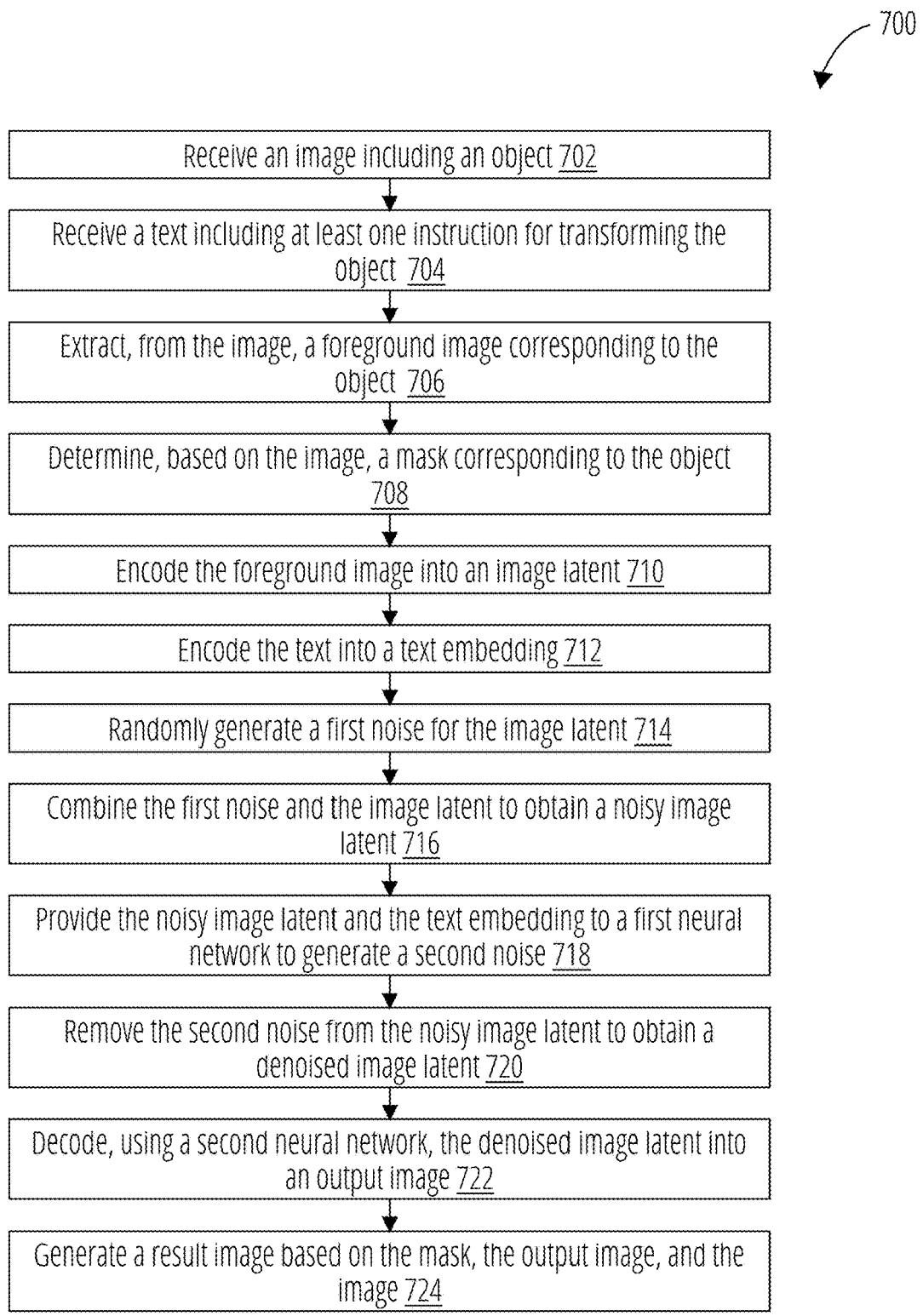
FIG. 7 illustrates a method for AI-driven foreground stylization using diffusion and object detection, according to an example embodiment.

FIG. 7 is a flow chart showing method 700 for AI-driven foreground stylization using diffusion and object detection, according to some example embodiments. In some embodiments, the operations of method 700 may be combined, performed in parallel, or performed in a different order. Method 700 may also include additional or fewer operations than those illustrated. Method 700 may be performed by processing logic that comprises hardware (e.g., decision making logic, dedicated logic, programmable logic, and microcode), software (such as software run on a general-purpose computer system or a dedicated machine), or a combination of both.

In block 702, the method 700 may commence with receiving an image. The image may include an object. In an example embodiment, the object may include a person. In block 704, the method 700 may proceed with receiving a text. The text may include at least one instruction for transforming the object.

In block 706, the method 700 may include extracting, from the image, a foreground image corresponding to the object. In block 708, the method 700 may proceed with determining, based on the image, a mask corresponding to the object.

In block 710, the method 700 may include encoding the foreground image into an image latent. In block 712, the method 700 may proceed with encoding the text into a text embedding. In an example embodiment, the text embedding may be encoded by a CLIP neural network model.

In an example embodiment, prior to encoding the text into the text embedding, the method 700 may include extracting, from the image, at least one feature associated with the object. The at least one feature may be extracted using a third neural network. The at least one feature may include one or more of the following: an ethnicity of the person, a gender of the person, an age of the person, an orientation of body of the person with respect to a plane of the image, and so forth. Upon extracting the at least one feature, the text may be updated with the at least one feature.

In block 714, the method 700 may further include randomly generating a first noise for the image latent. In block 716, the method 700 may proceed with combining the first noise and the image latent to obtain a noisy image latent. In block 718, the method 700 may include providing the noisy image latent and the text embedding to a first neural network to generate a second noise. In an example embodiment, the first neural network may include a U-Net neural network.

In an example embodiment, the method 700 may include generating, based on the image, a control vector corresponding to one or more key points in the image. The control vector may be provided to the first neural network during generation of the second noise. The first neural network may be designed to perform at least one spatial transformation of the object. At least one parameter of the at least one spatial transformation may be partially based on the control vector. In an example embodiment, the control vector may include information concerning a pose of the object.

In block 720, the method 700 may proceed with removing the second noise from the noisy image latent to obtain a denoised image latent. In block 722, the method 700 may include decoding, using a second neural network, the denoised image latent into an output image. In an example embodiment, prior to decoding the denoised image latent, the method 700 may include repeating the following two steps until the denoised image latent converges into a further image latent: providing the denoised image latent and the text embedding to the first neural network to update the second noise and removing the second noise from the denoised image latent.

In block 724, the method 700 may include generating a result image based on the mask, the output image, and the image. In an example embodiment, generating the result image may include blending, using the mask, the output image and the image.

Figure 8:
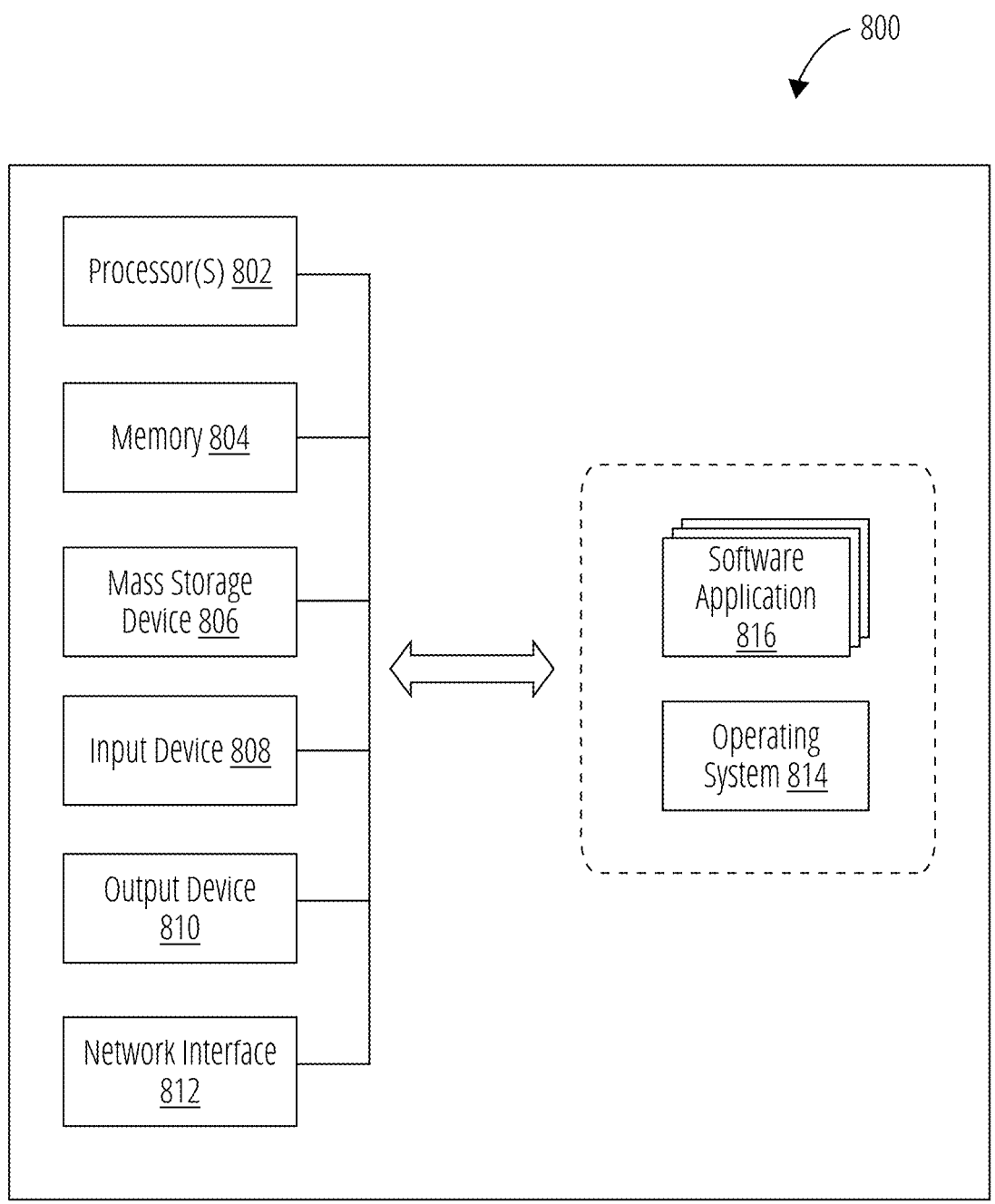
FIG. 8 is a high-level block diagram illustrating an example computer system, within which a set of instructions for causing the machine to perform any one or more of the methodologies discussed herein can be executed.

FIG. 8 is a high-level block diagram illustrating an example computer system 800, within which a set of instructions for causing the machine to perform any one or more of the methodologies discussed herein can be executed. The computer system 800 may include, refer to, or be an integral part of, one or more of a variety of types of devices, such as a general-purpose computer, a desktop computer, a laptop computer, a tablet computer, a netbook, a mobile phone, a smartphone, a personal digital computer, a smart television device, and a server, among others. In some embodiments, the computer system 800 is an example of computing device 102 shown in FIG. 1. Notably, FIG. 8 illustrates just one example of the computer system 800 and, in some embodiments, the computer system 800 may have fewer elements/modules than shown in FIG. 8 or more elements/modules than shown in FIG. 8.

The computer system 800 may include one or more processor(s) 802, a memory 804, one or more mass storage devices 806, one or more input devices 808, one or more output devices 810, and a network interface 812. The processor(s) 802 are, in some examples, configured to implement functionality and/or process instructions for execution within the computer system 800. For example, the processor(s) 802 may process instructions stored in the memory 804 and/or instructions stored on the mass storage devices 806. Such instructions may include components of an operating system 814 or software applications 816. The computer system 800 may also include one or more additional components not shown in FIG. 8, such as a body, a power supply, a power supply, a global positioning system receiver, and so forth.

The memory 804, according to one example, is configured to store information within the computer system 800 during operation. The memory 804, in some example embodiments, may refer to a non-transitory computer-readable storage medium or a computer-readable storage device. In some examples, the memory 804 is a temporary memory, meaning that a primary purpose of the memory 804 may not be long-term storage. The memory 804 may also refer to a volatile memory, meaning that the memory 804 does not maintain stored contents when the memory 804 is not receiving power. Examples of volatile memories include random access memories, dynamic random access memories, static random access memories, and other forms of volatile memories known in the art. In some examples, the memory 804 is used to store program instructions for execution by the processor(s) 802. The memory 804, in one example, is used by software (e.g., the operating system 814 or the software applications 816). Generally, the software applications 816 refer to software Applications suitable for implementing at least some operations of the methods for image and video transformation as described herein.

The mass storage devices 806 may include one or more transitory or non-transitory computer-readable storage media and/or computer-readable storage devices. In some embodiments, the mass storage devices 806 may be configured to store greater amounts of information than the memory 804. The mass storage devices 806 may further be configured for long-term storage of information. In some examples, the mass storage devices 806 include non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

The input devices 808, in some examples, may be configured to receive input from a user through tactile, audio, video, or biometric channels. Examples of the input devices 808 may include a keyboard, a keypad, a mouse, a trackball, a touchscreen, a touchpad, a microphone, one or more video cameras, image sensors, fingerprint sensors, or any other device capable of detecting an input from a user or other source, and relaying the input to the computer system 800, or components thereof.

The output devices 810, in some examples, may be configured to provide output to a user through visual or auditory channels. The output devices 810 may include a video graphics adapter card, a liquid crystal display monitor, a light emitting diode (LED) monitor, an organic LED monitor, a sound card, a speaker, a lighting device, a LED, a projector, or any other device capable of generating output that may be intelligible to a user. The output devices 810 may also include a touchscreen, a presence-sensitive display, or other input/output capable displays known in the art.

The network interface 812 of the computer system 800, in some example embodiments, can be utilized to communicate with external devices via one or more data networks such as one or more wired, wireless, or optical networks including, for example, the Internet, intranet, local area networks, wide area networks, cellular phone networks, Bluetooth radio, and an IEEE 902.11-based radio frequency network, Wi-Fi® networks, among others. The network interface 812 may be a network interface card, such as an Ethernet card, an optical transceiver, a radio frequency transceiver, or any other type of device that can send and receive information.

The operating system 814 may control one or more functionalities of the computer system 800 and/or components thereof. For example, the operating system 814 may interact with the software applications 816 and may facilitate one or more interactions between the software applications 816 and components of the computer system 800. As shown in FIG. 8, the operating system 814 may interact with or be otherwise coupled to the software applications 816 and components thereof. In some embodiments, the software applications 816 may be included in the operating system 814. In these and other examples, virtual modules, firmware, or software may be part of the software applications 816.

Thus, systems and methods for AI-driven foreground stylization using diffusion and object detection have been described. Although embodiments have been described with reference to specific example embodiments, it will be evident that various modifications and changes can be made to these example embodiments without departing from the broader spirit and scope of the present Application. Accordingly, the specification and drawings are to be regarded in an illustrative rather than a restrictive sense.

What is claimed is:

1. A method comprising:
   receiving an image including an object;
   receiving a text including at least one instruction for transforming the object;
   extracting, from the image, a foreground image corresponding to the object;
   determining, based on the image, a mask corresponding to the object;
   encoding the foreground image into an image latent;
   extracting, from the image, using a third neural network, at least one feature associated with the object, wherein the object includes a person and the at least one feature includes one or more of the following: an ethnicity of the person, a gender of the person, an age of the person, and an orientation of body of the person with respect to a plane of the image;
   updating the text with the at least one feature to obtain an updated text;

encoding the updated text into a text embedding;
randomly generating a first noise for the image latent;
combining the first noise and the image latent to obtain a noisy image latent;
providing the noisy image latent and the text embedding to a first neural network to generate a second noise;
removing the second noise from the noisy image latent to obtain a denoised image latent;
decoding, using a second neural network, the denoised image latent into an output image; and
generating a result image based on the mask, the output image, and the image.

2. The method of claim 1, further comprising, prior to decoding the denoised image latent, repeating the following steps until the denoised image latent converges into a further image latent:
providing the denoised image latent and the text embedding to the first neural network to update the second noise; and
removing the second noise from the denoised image latent.

3. The method of claim 1, wherein generating the result image includes blending, using the mask, the output image and the image.

4. The method of claim 1, further comprising:
generating, based on the image, a control vector corresponding to one or more key points in the image; and
providing the control vector to the first neural network during generation of the second noise.

5. The method of claim 4, wherein:
the first neural network is designed to perform at least one spatial transformation of the object; and
at least one parameter of the at least one spatial transformation is partially based on the control vector.

6. The method of claim 5, wherein the control vector includes information concerning a pose of the object.

7. The method of claim 1, wherein the first neural network includes a U-Net neural network.

8. The method of claim 1, wherein the text embedding is encoded by a Contrastive Language-Image Pretraining neural network model.

9. A computing device comprising:
a processor; and
a memory storing instructions that, when executed by the processor, configure the computing device to:
receive an image including an object;
receive a text including at least one instruction for transforming the object;
extract, from the image, a foreground image corresponding to the object;
determine, based on the image, a mask corresponding to the object;
encode the foreground image into an image latent;
extract, from the image, using a third neural network, at least one feature associated with the object, wherein the object includes a person and the at least one feature includes one or more of the following: an ethnicity of the person, a gender of the person, an age of the person, and an orientation of body of the person with respect to a plane of the image;
update the text with the at least one feature to obtain an updated text;
encode the updated text into a text embedding;
randomly generate a first noise for the image latent;
combine the first noise and the image latent to obtain a noisy image latent;
provide the noisy image latent and the text embedding to a first neural network to generate a second noise;
remove the second noise from the noisy image latent to obtain a denoised image latent;
decode, using a second neural network, the denoised image latent into an output image; and
generate a result image based on the mask, the output image, and the image.

10. The computing device of claim 9, wherein the instructions further configure the computing device to, prior to decoding the denoised image latent, repeating the following steps until the denoised image latent converges into a further image latent:
provide the denoised image latent and the text embedding to the first neural network to update the second noise; and
remove the second noise from the denoised image latent.

11. The computing device of claim 9, wherein generating the result image includes blending, using the mask, the output image and the image.

12. The computing device of claim 9, wherein the instructions further configure the computing device to:
generate, based on the image, a control vector corresponding to one or more key points in the image; and
provide the control vector to the first neural network during generation of the second noise.

13. The computing device of claim 12, wherein:
the first neural network is designed to perform at least one spatial transformation of the object; and
at least one parameter of the at least one spatial transformation is partially based on the control vector.

14. The computing device of claim 13, wherein the control vector includes information concerning a pose of the object.

15. The computing device of claim 9, wherein the first neural network includes a U-Net neural network.

16. A non-transitory computer-readable storage medium, the computer-readable storage medium including instructions that, when executed by a computing device, cause the computing device to:
receive an image including an object;
receive a text including at least one instruction for transforming the object;
extract, from the image, a foreground image corresponding to the object;
determine, based on the image, a mask corresponding to the object;
encode the foreground image into an image latent;
extract, from the image, using a third neural network, at least one feature associated with the object, wherein the object includes a person and the at least one feature includes one or more of the following: an ethnicity of the person, a gender of the person, an age of the person, and an orientation of body of the person with respect to a plane of the image;
update the text with the at least one feature to obtain an updated text;
encode the updated text into a text embedding;
randomly generate a first noise for the image latent;
combine the first noise and the image latent to obtain a noisy image latent;
provide the noisy image latent and the text embedding to a first neural network to generate a second noise;
remove the second noise from the noisy image latent to obtain a denoised image latent;
decode, using a second neural network, the denoised image latent into an output image; and generate a result image based on the mask, the output image, and the image.

* * * * *